(No Model.) 3 Sheets—Sheet 1.

S. W. WOOD.
MOTOR FOR STREET CARS.

No. 364,881. Patented June 14, 1887.

Witnesses.
F. R. Cunningham
Robt. H. White

S. W. Wood
Inventor,
By D. B. Gallatin
his Attorney.

(No Model.) 3 Sheets—Sheet 2.

S. W. WOOD.
MOTOR FOR STREET CARS.

No. 364,881. Patented June 14, 1887.

Witnesses
F. R. Cunningham
Rob't H. White

S. W. Wood
Inventor
By his Attorney
D. B. Gallatin (No Model.) 3 Sheets—Sheet 3.

S. W. WOOD.
MOTOR FOR STREET CARS.

No. 364,881. Patented June 14, 1887.

Witnesses
Jos. A. Ryan
Wm. F. Brentemann

S. W. Wood Inventor
By his Attorney
D. B. Gallatin

United States Patent Office.

STEPHEN W. WOOD, OF CORNWALL, NEW YORK.

MOTOR FOR STREET-CARS.

SPECIFICATION forming part of Letters Patent No. 364,881, dated June 14, 1887.

Application filed December 28, 1886. Serial No. 222,834. (No model.)

*To all whom it may concern:*

Be it known that I, STEPHEN W. WOOD, a citizen of the United States, residing at Cornwall, in the county of Orange and State of New York, have invented certain new and useful Improvements in Motors for Street-Cars, &c.; and I do hereby declare the following to be a full, clear, and exact description of the invention, such as will enable others skilled in the art to which it appertains to make and use the same.

Figure 1:
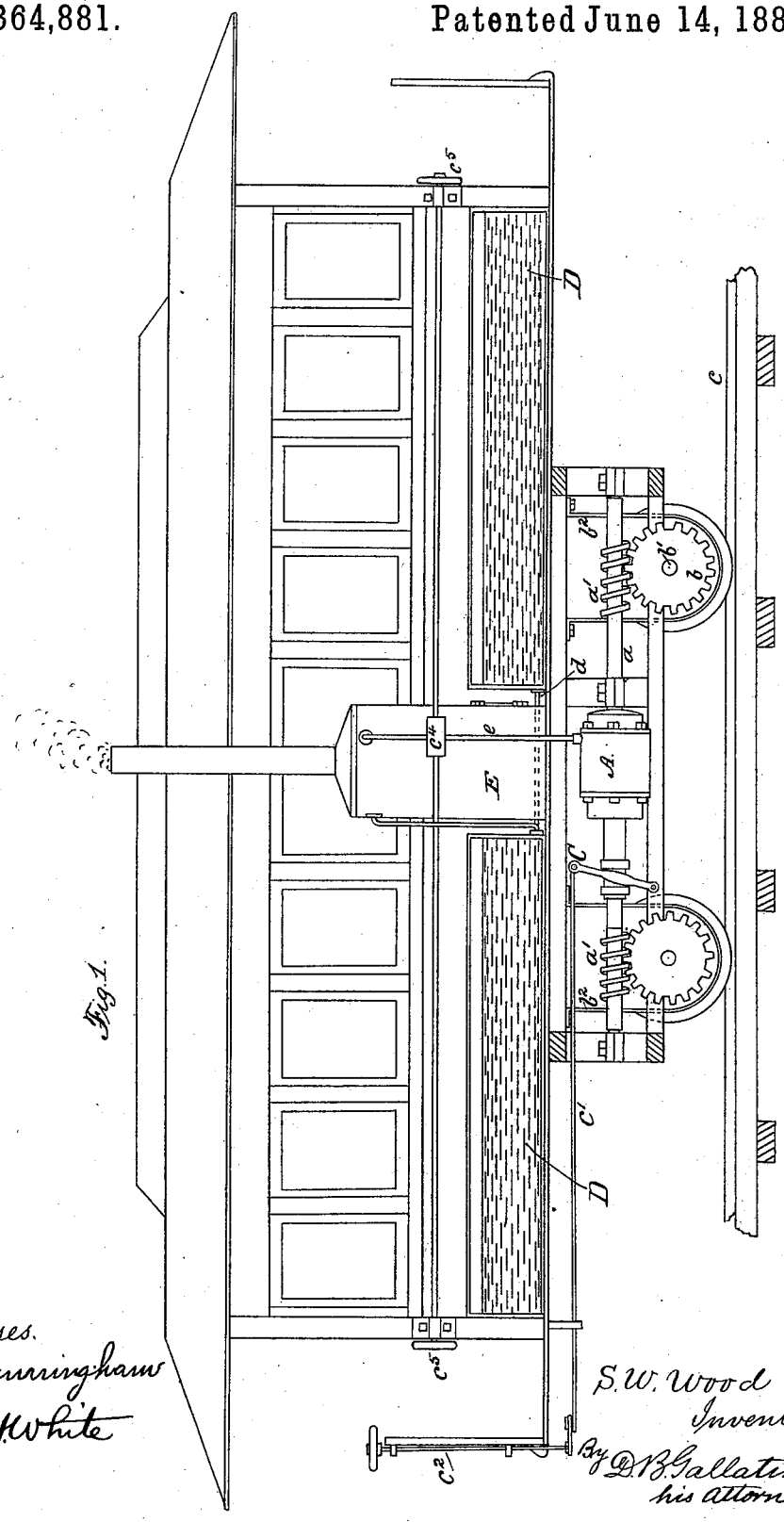
Figure 2:
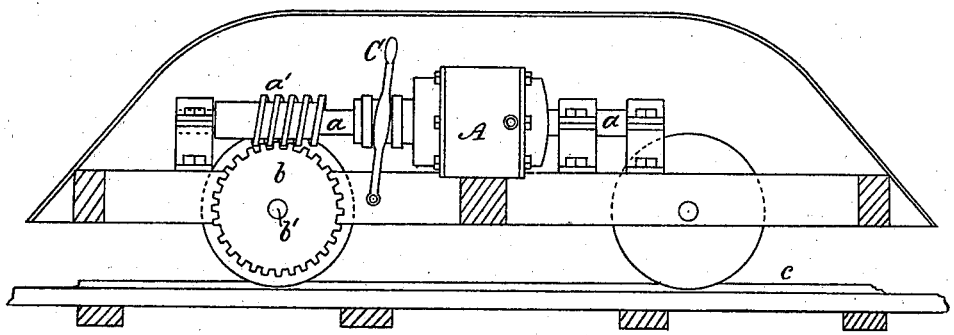
Figure 3:
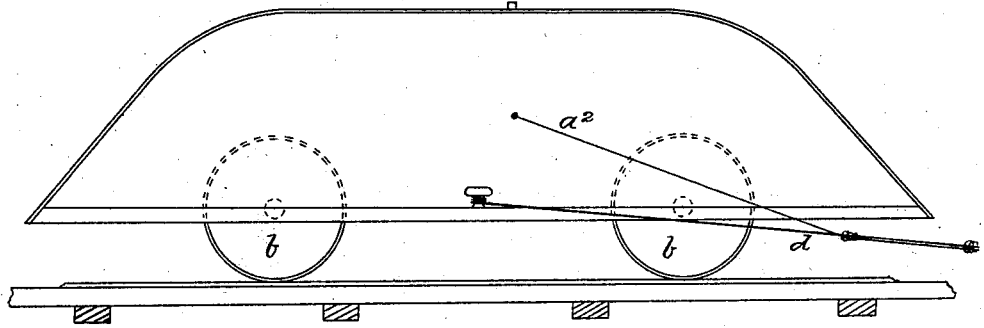

In the accompanying drawings, which form a part of this specification, Figure 1 is a vertical longitudinal section of a street-car with my motor applied thereto. Fig. 2 is a vertical longitudinal section through the motor separate from the car; Fig. 3, a side elevation of the same, and Fig. 4 a perspective view showing the application of my motor to the towing of canal-boats.

My invention has for its object to provide a motor for the purpose stated which shall be efficient, reliable, and economical, and which shall be cheap in construction and simple in operation; and to these ends it consists in the construction and arrangement now to be described, and afterward defined in the claims hereunto appended.

In carrying out my invention I employ a rotary steam-engine, A, of any preferred construction, which is mounted on the truck of the car, its shaft $a$ being arranged longitudinally on the truck, so as to cross the axle or axles, as clearly shown in the drawings. The shaft $a$ is provided with one or more worms, $a'$, which engage with worm-gears $b$, which are rigidly mounted on the axles $b'$ of the truck. Thus when the engine is in operation the worm or worms $a'$ will rotate the gears $b$, and through them the axles and wheels of the truck, causing the latter to move along on the track $c$.

C is a reversing lever, by which the engine is reversed to reverse the direction of movement of the car. This lever is connected with a shaft, $c^2$, at the end of the car by a connecting-rod, $c'$, under the car, by which the lever is operated from the platform. While I have shown a connecting-rod at one end of the car only, it is obvious that a double connection may be made, so as to permit the lever to be operated and the engine reversed from either platform.

E designates the boiler from which steam is supplied to the engine. This boiler, as shown, is located within the car, and is connected with the engine by a steam-pipe, $e$, which passes through the bottom of the car.

$c^4$ is a valve or gate in the steam-pipe, which controls the admission of steam to the engine A. This valve or gate is connected with a hand wheel or lever, $c^5$, at either end of the car, so that it may be operated from either platform to let on or shut off steam and to govern the speed of the car, this provision being necessary to enable the conductor to change his station when the direction of travel is reversed.

D designates water tanks or reservoirs, which are located under the seats of the car, where they are out of the way. The several reservoirs or tanks (when more than one are provided) are connected by pipes $d$, in order that water may flow from the others into the one from which it is pumped into the boiler.

The gears $a'$ $b$ are protected and dust and dirt excluded therefrom by casings or housings $b^2$, which are attached to the truck-frame, as indicated in Fig. 1.

It will be observed that no brakes are shown for checking or stopping the movement of the car. They are not necessary, for the reason that the worms $a'$ will, when steam is shut off and the shaft $a$ ceases to revolve, act as brakes or stops to prevent further rotation of the wheels. By shutting off the steam gradually the worms will act to check the movement of the car by degrees, the same as with an ordinary hand-brake.

By employing a rotary engine and gearing directly to the shaft of the same I avoid the use of cranks and connecting-rods, reduce the number of joints and fittings, and so simplify the construction and operation, and also produce an evenly-working motor, which is constant in its action, and hence less liable to wear or break, which is easily regulated to run at any desired speed, which avoids dead-centers, and in which a given amount of steam exerts more power than can be obtained from a reciprocating engine under any arrangement hitherto proposed. For the purpose for which it is here used a rotary engine, or an engine of the character referred to, is superior to a reciprocating engine, for the reason that when the latter is used at least two cylinders are indispensable in order to overcome dead-centers, while the former has no centers to pass. Moreover, a rotary engine is much less noisy than a reciprocating engine, and hence is less objectionable, because less liable to frighten horses on the streets.

I desire to have it understood that the term "rotary engine" as herein used is intended to include all engines in which a rotary shaft is directly connected with and forms a part of the engine, and especially such as have their rotary shafts in a line parallel with the axes of the cylinders.

Figure 4:
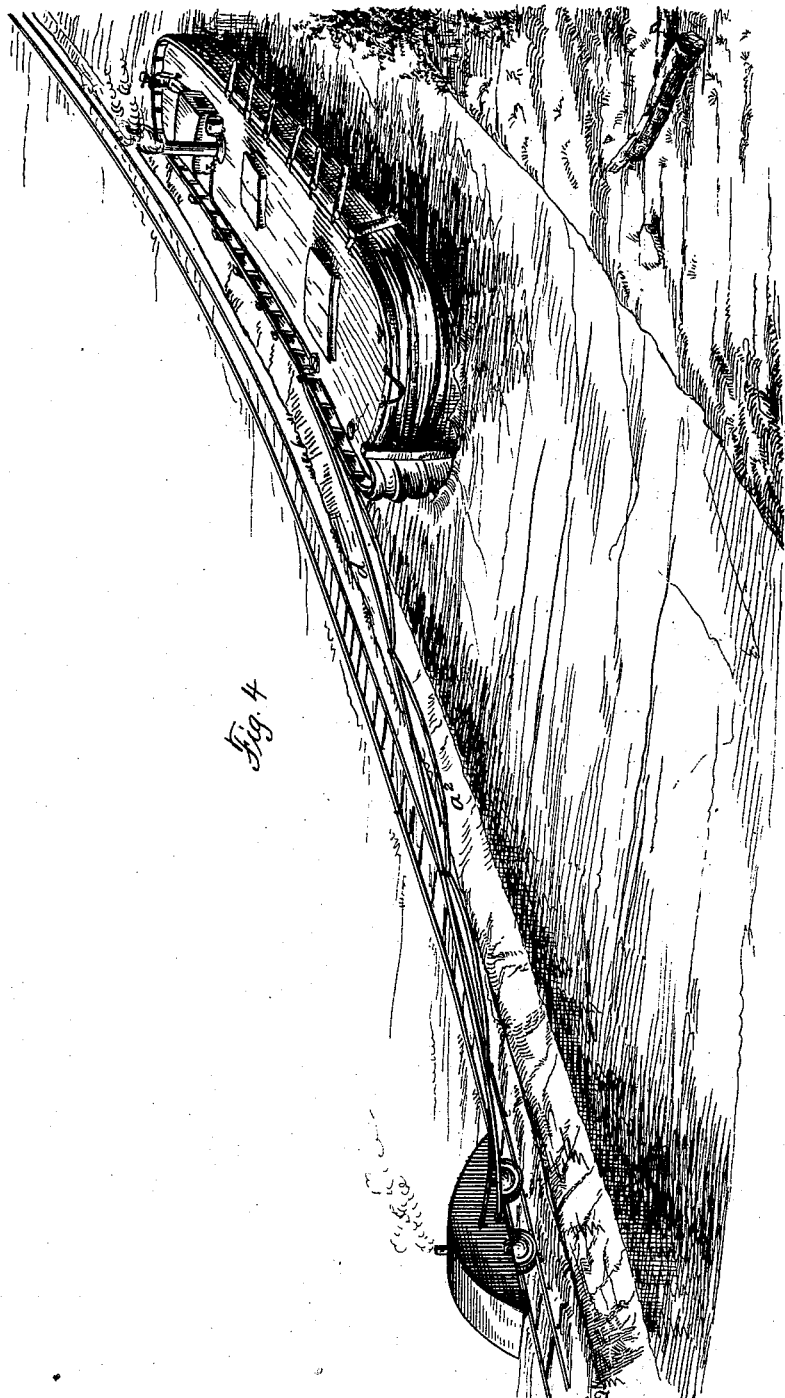

In Figs. 2 and 3 a motor is shown separate from the car, which is adapted to be used for towing or hauling cars, boats, or other objects, and in Fig. 4 the same is represented in use for towing a canal-boat. In this case the boiler which supplies steam to the engine is located on the boat, and is connected with the engine by a flexible steam-pipe, $a^2$, which is lashed to and supported by the tow-line $d$.

The motor illustrated in Figs. 2, 3, and 4 does not differ from that above described so far as the arrangement of the engine and the manner of gearing the same with the axles of the truck are concerned, and it is shown in this form merely to show the applicability of my invention to different purposes and uses.

Having thus described my invention, what I claim is—

The combination, with a truck adapted to run on a track, of an engine having a rotary shaft in line with or parallel to the cylinder, said engine mounted on said truck and its shaft crossing the axle of the same, a worm, $a'$, on the shaft engaging with a worm-gear, $b$, rigidly secured to the axle, and serving the double purpose of driving-gear and brake, substantially as shown and described.

In testimony whereof I affix my signature in presence of two witnesses.

STEPHEN W. WOOD.

Witnesses:
G. W. BALLOCH,
T. R. CUNNINGHAM.